(12) United States Patent
Okazaki et al.

(10) Patent No.: US 9,473,049 B2
(45) Date of Patent: Oct. 18, 2016

(54) INDUCTION HEATING APPARATUS AND POWER GENERATION SYSTEM COMPRISING THE SAME

(75) Inventors: Toru Okazaki, Osaka (JP); Tetsuji Matsuo, Kyoto (JP); Takeshi Mifune, Kyoto (JP)

(73) Assignees: Sumitomo Electric Industries, Ltd., Osaka-shi, Osaka (JP); Kyoto University, Kyoto-shi, Kyoto (JP)

( * ) Notice: Subject to any disclaimer, the term of this patent is extended or adjusted under 35 U.S.C. 154(b) by 236 days.

(21) Appl. No.: 14/123,807

(22) PCT Filed: May 30, 2012

(86) PCT No.: PCT/JP2012/063888
§ 371 (c)(1),
(2), (4) Date: Dec. 4, 2013

(87) PCT Pub. No.: WO2012/169398
PCT Pub. Date: Dec. 13, 2012

(65) Prior Publication Data
US 2014/0110938 A1    Apr. 24, 2014

(30) Foreign Application Priority Data

Jun. 8, 2011 (JP) ................................ 2011-128713

(51) Int. Cl.
*B60L 1/02* (2006.01)
*F01K 15/00* (2006.01)
(Continued)

(52) U.S. Cl.
CPC .............. *H02N 99/00* (2013.01); *F03D 9/006* (2013.01); *H05B 6/108* (2013.01); *H05B 6/109* (2013.01); *Y02E 10/72* (2013.01)

(58) Field of Classification Search
CPC ............ F03D 9/00; F03D 9/006; F03D 9/10; F03D 9/18
USPC .................. 290/2, 44, 55; 310/16, 49.32, 64; 336/115, 117–119, 130–132, 212, 233
See application file for complete search history.

(56) References Cited

U.S. PATENT DOCUMENTS 4,421,967 A * 12/1983 Birgel ..................... F03D 9/006
                                                        219/618
2008/0296989 A1* 12/2008 Fujita ....................... H02K 1/265
                                                        310/156.44
(Continued)

FOREIGN PATENT DOCUMENTS

CN          2222814 Y      3/1996
CN        101922789 A     12/2010
(Continued)

OTHER PUBLICATIONS

Machine translation of JP 2005174801, which was also published as 3955888 as identified by documents submitted by Applicant with IDS dated Apr. 9, 2015.*
(Continued)

*Primary Examiner* — Tulsidas C Patel
*Assistant Examiner* — Thomas Quigley
(74) *Attorney, Agent, or Firm* — Drinker Biddle & Reath LLP (57) ABSTRACT

An induction heating apparatus includes a rotor having a rotation shaft, and a stator having a heating portion disposed at a distance from the rotor. A coil that generates magnetic flux in a direction of the heating portion is provided in the rotor. The heating portion is formed of a composite material of a magnetic material and a conductive material, and has a structure in which a magnetic material portion and a conductive material portion are combined. When the coil is in a position opposed to the heating portion, a cross-sectional area of the magnetic material portion is smaller than an area of linkage of magnetic flux generated by the coil in the heating portion, and the conductive material portion is disposed to surround a periphery of the magnetic material portion. A flow passage in which the heating medium circulates is provided in the heating portion.

7 Claims, 6 Drawing Sheets

(51) Int. Cl.
*H02N 99/00* (2006.01)
*F03D 9/00* (2016.01)
*H05B 6/10* (2006.01)

(56) References Cited

U.S. PATENT DOCUMENTS

| | | | | |
|---|---|---|---|---|
| 2010/0277136 | A1* | 11/2010 | Snitchler | H02K 1/165 322/59 |
| 2010/0329652 | A1* | 12/2010 | Gregg | F03D 7/0272 392/497 |
| 2011/0043058 | A1* | 2/2011 | Heitzler | H02K 1/02 310/52 |
| 2011/0074231 | A1* | 3/2011 | Soderberg | H01F 3/10 310/44 |
| 2012/0193924 | A1 | 8/2012 | Okazaki | |

FOREIGN PATENT DOCUMENTS

| | | |
|---|---|---|
| EA | 12474 B1 | 10/2009 |
| JP | S57-140573 A | 8/1982 |
| JP | 2005-011625 A | 1/2005 |
| JP | 2005-174801 A | 6/2005 |
| JP | 3955888 B2 | 8/2007 |
| RU | 2097946 C1 | 11/1997 |
| TW | I263761 | 10/2006 |
| WO | WO 03/011002 A2 | 2/2003 |
| WO | WO 2007/041461 A2 | 4/2007 |
| WO | WO-2011/045999 A1 | 4/2011 |

OTHER PUBLICATIONS

Machine translation of JP 2005011625.*
"Wind Power Generation (01-05-01-05)", [online] ATOMICA [searched on Feb. 2, 2011], Internet <URL:http://www.rist.or.jp/atomica/>, including Partial English Translation.
"Subaru Wind Turbine", [online] Fuji Heavy Industries, Ltd., [searched on Feb. 2, 2011], Internet <URL: http://www.subaru-windturbine.jp/windturbine/>, including Partial English Translation.
"Wind Power Lecture", [online], Mitsubishi Heavy Industries, Ltd., [searched on Feb. 2, 2011], Internet <URL: http://www.mhi.co.jp/products/expand/wind_kouza_0101.html>, including Partial English Translation.

* cited by examiner

INDUCTION HEATING APPARATUS AND POWER GENERATION SYSTEM COMPRISING THE SAME

TECHNICAL FIELD

The present invention relates to an induction heating apparatus that heats a heating medium by utilizing induction heating, and a power generation system including the induction heating apparatus.

BACKGROUND ART

A heating apparatus that utilizes induction heating (eddy current) has been proposed as an apparatus for heating water (see, for example, PTD 1). The eddy current heating apparatus described in PTD 1 includes a rotatable rotor having a permanent magnet disposed on an outer periphery thereof, and a heating portion made of a conductive material, which is fixed to the outside of the rotor, and in which a flow passage is formed to allow water to circulate inside. When the rotor rotates, magnetic lines of force (magnetic flux) generated by the permanent magnet around the outer periphery of the rotor move by penetrating through the heating portion, which causes eddy current to be generated in the heating portion, to heat the heating portion itself. Consequently, heat generated in the heating portion is transferred to the water circulating in the inside flow passage to heat the water.

A primary object of the above-described technology is to supply hot water by utilizing energy such as wind power or the like, and in recent years, power generation systems that similarly utilize renewable forms of energy such as wind power, hydraulic power, wave power, and the like have been attracting attention.

NPDs 1 to 3, for example, describe technologies relating to wind power generation. Wind power generation generates electric power by driving a power generator by rotating a wind turbine with winds, and converts wind energy into rotational energy to obtain the converted energy as electrical energy. Wind power generation systems generally have a structure in which a nacelle is set up on the top of a tower, and a horizontal-axis wind turbine (a wind turbine whose rotation shaft is substantially parallel to the direction of winds) is attached to the nacelle. The nacelle houses a speed-increasing machine that outputs an increased rotational speed of the rotation shaft of the wind turbine, and a power generator that is driven by the output from the speed-increasing machine. The speed-increasing machine can increase the rotational speed of the wind turbine up to a rotational speed of the power generator (1:100, for example), and incorporates a gearbox.

In recent years, there is a tendency to increase the size of wind turbines (wind power generation systems) to reduce power generation costs, and wind power generation systems of a class having a wind turbine diameter of 120 m or greater and an output per turbine of 5 MW have been put into practical use. Many of such large wind power generation systems are constructed on the ocean, for reasons of construction owing to their huge size and heavy weight.

Moreover, in wind power generation, since the power generation output (amount of power generation) varies with varying wind power, a power storage system is set up together with the wind power generation system to store unstable electric power in storage batteries, so as to smooth out the output.

CITATION LIST

Patent Document

PTD 1: Japanese Patent Laying-Open No. 2005-174801

Non Patent Document

NPD 1: "Wind power generation (01-05-01-05)", [online], ATOMICA [searched on Feb. 2, 2011], Internet <URL: http://www.rist.or.jp/atomica/>

NPD 2: "SUBARU WIND TURBINE", [online], Fuji Heavy Industries, Ltd., [searched on Feb. 2, 2011], Internet <URL: http://www.subaru-windturbine.jp/windturbine/>

NPD 3: "Wind Power Lecture", [online], Mitsubishi Heavy Industries, Ltd., [searched on Feb. 2, 2011], Internet <URL: http: //www.mhi.co.jp/products/expand/wind_kouza.html>

SUMMARY OF INVENTION

Technical Problem

In the conventional induction heating apparatus as described in PTD 1 described above, however, the heating portion is formed of a single conductive material such as stainless steel, an aluminum alloy, or the like, and hence, sufficient thermal energy (amount of heat generation) may not be achieved, and a heating medium (a liquid such as water, for example) may not be heated to a desired temperature.

Meanwhile, in generally and widely known wind power generation systems, a power storage system is set up to smooth out the output, and this power storage system requires components such as converters and the like to store electric power in storage batteries. This makes the system more complicated, and increases power loss. Moreover, in the case of a large wind power generation system, storage batteries with a large capacity corresponding to the amount of power generation are required, which increases costs of the overall system.

Furthermore, many failures in a wind power generation system are caused by troubles with the speed-increasing machine, more specifically, the gearbox. In the event of a gearbox failure, the failure is usually dealt with by replacing the gearbox with a new one; however, when a nacelle is set up on the top of a tower, attachment/removal of a gearbox requires a great deal of time and effort. In recent years, therefore, gearless variable-speed wind power generators that do not require a speed-increasing machine also exist.

In the case of a gearless power generator, specifically, the number of poles of the power generator is increased (multipolar power generator); however, this increases the size and weight of the power generator, as compared to the case of using a speed-increasing machine. Particularly with a 5 MW-class large wind power generation system, the weight of the power generator is believed to exceed 300 tons (300000 kg), which makes it difficult to place the power generator in the nacelle.

The present invention was made in view of the above-described circumstances, and one object of the invention is to provide an induction heating apparatus that achieves an improved amount of heat generation, and has performance suitable for heating a heating medium. Another object of the invention is to provide a power generation system including the induction heating apparatus described above.

Solution to Problem

As a result of trial and error to further increase the amount of heat generation in designing an induction heating apparatus, the present inventors calculated that in a conductive material (heating portion) to which a periodically changing magnetic field (magnetic flux) is externally applied, heat is generated in accordance with the following mathematical expression:

$$W = (\sigma\omega^2\delta/4k^2)B_{1y}^2 = (\delta/4)\sigma v^2 B_{1y}^2 = \sigma(\pi f_0 R)^2 \delta B_{1y}^2 = (\pi f_0 R)^2 [\sigma/(n\pi f_0 \mu)]^{1/2} B_{1y}^2 \quad \text{[Mathematical Expression 1]}$$

In the right-hand side of the mathematical expression, $f_0$ is the frequency, R is the inside diameter of the heating portion, n is the number of poles, $\sigma$ is the electrical conductivity of the heating portion, $\mu$ is the magnetic permeability of the heating portion, and $B_{1y}$ is the magnetic field strength in the heating portion. Moreover, $\overline{\omega}$ is the angular speed ($\overline{\omega}=2\pi f_0$), $\delta$ is the skin thickness of the heating portion ($\delta=[2/(\overline{\omega}\mu\sigma)]^{1/2}$), k is the wave number (k=n/R), and v is the speed ($v=\overline{\omega}/k$). The inventors also found from this mathematical expression that the amount of heat generation is effectively improved by forming the heating portion with a material that is both high in magnetic permeability ($\mu$) and electrical conductivity ($\sigma$). It is noted that in the right-hand side of the mathematical expression, a reason why the amount of heat generation (W) increases as $\mu$ becomes higher even though $\mu$ is included in the denominator is that $B_{1y}$ in the mathematical expression is represented by $\mu H_{1y}$, and consequently the 3/2th power of $\mu$ is left in the numerator. $H_{1y}$ is the magnetic field in the heating portion. Here, a reason why $H_{1y}$ is not used for the expression in mathematical expression 1 above is that since it is the magnetic flux density that can be actually measured, the expression in mathematical expression 1 was believed to be easier for practical use. The present invention was made based on the findings described above.

An induction heating apparatus according to the present invention is an apparatus that heats a heating medium, including a rotor having a rotation shaft, and a stator having a heating portion disposed at a distance from the rotor. A magnetic flux generating portion that generates magnetic flux in a direction of the heating portion is provided in the rotor to be opposed to the heating portion. The heating portion is formed of a composite material of a magnetic material and a conductive material, and has a structure in which a magnetic material portion and a conductive material portion are combined. When the magnetic flux generating portion is in a position opposed to the heating portion, a cross-sectional area of the magnetic material portion is smaller than an area of linkage of magnetic flux generated by the magnetic flux generating portion in the heating portion, and the conductive material portion is disposed to surround a periphery of the magnetic material portion. In the heating portion, a flow passage in which the heating medium circulates is provided.

In the case of forming the heating portion with a single material, generally, since there is no material that is both high in $\mu$ and $\sigma$, it is difficult to obtain an optimum material as designed. With the above-described structure, since the heating portion is formed of the composite material of a magnetic material having high $\mu$ and a conductive material having high $\sigma$, a design can be made by freely selecting $\mu$ and $\sigma$ of the heating portion, so as to improve the amount of heat generation. Furthermore, when the magnetic flux generating portion is in a position opposed to the heating portion, the cross-sectional area of the magnetic material portion is smaller than the area of linkage of magnetic flux generated by the magnetic flux generating portion in the heating portion. At this time, in a region of the heating portion where the linkage of magnetic flux from the magnetic flux generating portion occurs, the magnetic material portion and the conductive material portion are mixed to adjust $\mu$ and $\sigma$. The magnetic material portion may, for example, be formed with a columnar or plate shape to extend from one end surface to the other end surface parallel to a direction of the magnetic flux generated by the magnetic generating portion (that is, a direction of thickness of the heating portion).

As the magnetic material forming the magnetic material portion, it is preferred to select a material having high $\mu$, for example, a magnetic material whose $\mu$ is 1000 or greater when calculated as relative permeability. Specific examples of the magnetic material include iron, nickel, cobalt, silicon steel, permalloy, ferrite, and the like. As the conductive material forming the magnetic material portion, it is preferred to select a material having high $\sigma$, for example, a conductive material whose $\sigma$ is $3\times10^7$ S/m or greater. Specific examples of the conductive material include metals such as aluminum, copper, and the like, and alloys thereof. It is noted, however, that different materials are selected for the magnetic material and the conductive material, and, as one example of a combination of the magnetic material and the conductive material, an iron-based material may be selected as the magnetic material, and an aluminum- or copper-based material may be selected as the conductive material. The aluminum- or copper-based material is preferred since it also has excellent thermal conductivity, and a flow passage in which the heating medium circulates is preferably provided in the conductive material portion formed of the conductive material. Particularly when the conductive material portion is formed of the aluminum-based material, the heating portion can be more lightweight, thus achieving weight reduction in the induction heating apparatus. Examples of the heating medium include liquids such as water, oil, liquid metals (Na, Pb, and the like), molten salts, and the like, and gases.

Furthermore, since the flow passage is provided in the heating portion that is fixed without rotating, it is unnecessary to use a rotary joint that permits rotational movement of the flow passage, for connecting the flow passage and a supply/discharge pipe communicating with the flow passage to externally supply the heating medium and discharge it, thereby realizing a robust connection with a simple structure. Specifically, it is believed that when the heating medium is heated, pressure inside the flow passage increases to reach approximately 25 MPa (250 atmospheres) at 600° C., where the heating medium is water (steam), for example. If the heating portion (flow passage) rotates, a special rotary joint that can withstand the pressure is needed; however, where the heating portion is fixed without rotating, a rotary joint is not needed, and a sufficiently robust connection structure can be realized even by using a simple method, for example, welding, to connect the supply/discharge pipe and the flow passage.

In one form of the induction heating apparatus according to the present invention, when the magnetic flux generating portion is in a position opposed to the heating portion, a plurality of the magnetic material portions may be present in the region of the heating portion where the linkage of magnetic flux from the magnetic flux generating portion occurs.

With this structure, since the plurality of the magnetic material portions are present in the region of the heating portion where the linkage of magnetic flux from the magnetic flux generating portion occurs, a structure in which the magnetic material portion appears to be divided into a plurality of parts is obtained. Thermal distribution can be equalized by reducing the imbalance between $\mu$ and $\sigma$ in the heating portion. Moreover, for example, by providing the flow passage in which the heating medium circulates in the conductive material portion between the magnetic material portions, it is possible to transfer heat to the heating medium, allowing heat to be obtained efficiently. Furthermore, the weight and size per each magnetic material portion can be reduced, thus achieving improved ease of assembling.

In one form of the induction heating apparatus according to the present invention, the magnetic material portions have a circular or polygonal cross-sectional shape.

While the cross-sectional shape of the magnetic material portions may be any shape and is not particularly limited, it may be circular or polygonal, for example. A variety of shapes can be adopted, and, for example, in the case of a circular shape, a perfectly circular shape or an oval shape can be adopted, and in the case of a polygonal shape, a triangular shape or a quadrangular shape can be adopted. Particularly when the cross-sectional shape of the magnetic material portions is a shape with round peripheral edges, such as a circular shape, cogging torque can be reduced to achieve smooth rotation of the rotor. It is noted that the cross-sectional shape of the magnetic material portions refers to the shape of a cross section perpendicular to the direction of the magnetic flux generated by the magnetic flux generating portion.

In one form of the induction heating apparatus according to the present invention, the magnetic flux generated by the magnetic flux generating portion may be that generated by a coil.

A permanent magnet or a coil (electromagnet) may be used as a means of generating the magnetic flux. The coil may be a normal conducting coil such as a copper wire, or a superconducting coil such as a superconducting wire material, for example. In the case of using a coil, a stronger magnetic field can be generated as compared to the case of using a permanent magnet. Specifically, a strong magnetic field can be generated by increasing the current supplied through the coil, and the strength of the magnetic field can also be adjusted by controlling the supplied current. Since the amount of heat generation is proportional to the square of magnetic field strength, further improvement in the amount of heat generation can be expected. Moreover, as compared with a permanent magnet, a coil is unlikely to cause deterioration of the magnetic properties due to an increase in temperature, or deterioration of the magnetic properties with time. Hence, where the magnetic flux generated by the magnetic flux generating portion is that generated by a coil, a sufficient magnetic field strength can be easily maintained by increasing the supplied current, and performance (thermal energy) sufficient to heat the heating medium to a predetermined temperature (100 to 600° C., for example) can be achieved. In the induction heating apparatus described in PTD 1 above, for example, since the permanent magnet is disposed in a position opposed to and near the heating portion, the temperature of the permanent magnet is easily increased due to the influence of heat from the heating portion, and therefore, the magnetic properties may deteriorate and consequently, the heating medium may not be heated to a desired temperature. It is noted that a direct current may be passed through the coil to generate a direct-current magnetic field.

Furthermore, in the case of passing a direct current through the coil to generate a direct-current magnetic field, if a superconducting coil is used, electrical resistance becomes zero, and even if a large current is passed, substantially no heat (loss) is generated in the coil. As compared with a normal conducting coil, therefore, heat generation (loss) in the coil caused by passing a large current can be suppressed, and an extremely strong magnetic field can be maintained without any power loss.

In one form of the induction heating apparatus according to the present invention, the rotation shaft may be connected to a wind turbine, and wind power may be utilized as mechanical power for rotating the rotor.

While an internal combustion engine such as an electric motor, an engine, or the like can be utilized as mechanical power for the rotor (rotation shaft), it is preferred to utilize renewable energy such as wind power, hydraulic power, wave power, or the like. The utilization of renewable energy allows suppression of increase in $CO_2$, and, among the above, wind power is advantageously used.

A power generation system according to the present invention is characterized in that it includes the above-described induction heating apparatus according to the present invention, and a power generating portion that converts the heat of the heating medium heated by the induction heating apparatus into electrical energy.

This power generation system is a heretofore-unavailable novel power generation system that utilizes the heat of the heating medium heated by using the above-described induction heating apparatus, to generate power. For example, if a wind turbine is connected to the rotation shaft of the induction heating apparatus, and wind power is utilized as mechanical power for the rotor, it is possible to convert wind energy into rotational energy and then into thermal energy, and obtain it as electrical energy. As one example, water as the heating medium may be heated to produce high-temperature and high-pressure steam, and electric power may be generated by rotating the power generator with a steam turbine using the steam. Since this power generation system has a structure that converts heat into electrical energy, it can realize efficient and stable power generation by storing energy in the form of heat by using a heat storage device. Furthermore, a heat storage system that can store heat in the heat storage device, and can simultaneously draw out heat required to generate power from the heat storage device, is simple as compared with the power storage system, and the heat storage device is inexpensive as compared with power storage batteries. Furthermore, there is no need to provide a speed-increasing machine as in conventional wind power generation systems, thus avoiding a trouble with a gearbox.

Advantageous Effects of Invention

In the induction heating apparatus according to the present invention, since the heating portion is formed of the composite material of the magnetic material and the conductive material, and has a structure in which the magnetic material portion and the conductive material portion are combined, the amount of heat generation can be improved. Moreover, the power generation system according to the present invention can generate power by the power generating portion converting the heat of the heating medium heated by utilizing the above-described induction heating apparatus into electrical energy.

BRIEF DESCRIPTION OF DRAWINGS

FIGS. 1A and 1B are schematic diagrams of the induction heating apparatus according to a first embodiment, wherein

FIGS. 5A and 5B are partially enlarged developed plan views, schematically showing a modification of a flow passage in the induction heating apparatus, wherein

DESCRIPTION OF EMBODIMENTS

Embodiments of the present invention will be described using the drawings. In the drawings, the same or corresponding portions are indicated by the same characters.

Induction Heating Apparatus

First Embodiment

Induction heating apparatus 101 according to a first embodiment shown in FIGS. 1 to 3 FIGS. 1A to 3 includes rotor 11 and stator 12 having heating portion 13. The structure of induction heating apparatus 101 will be described in detail below.

Figure 1A:
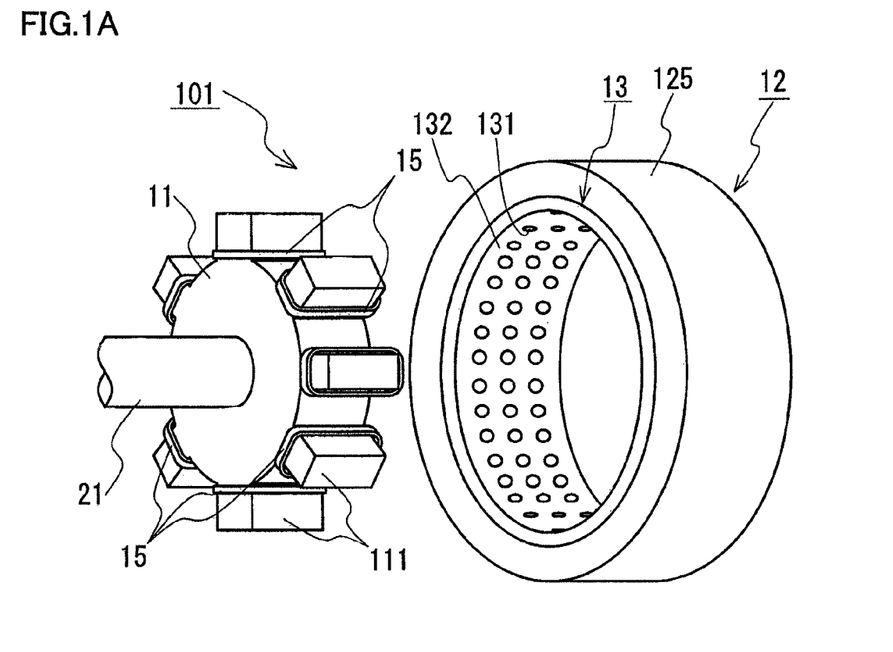
FIG. 1A shows an exploded perspective view.
Figure 1B:
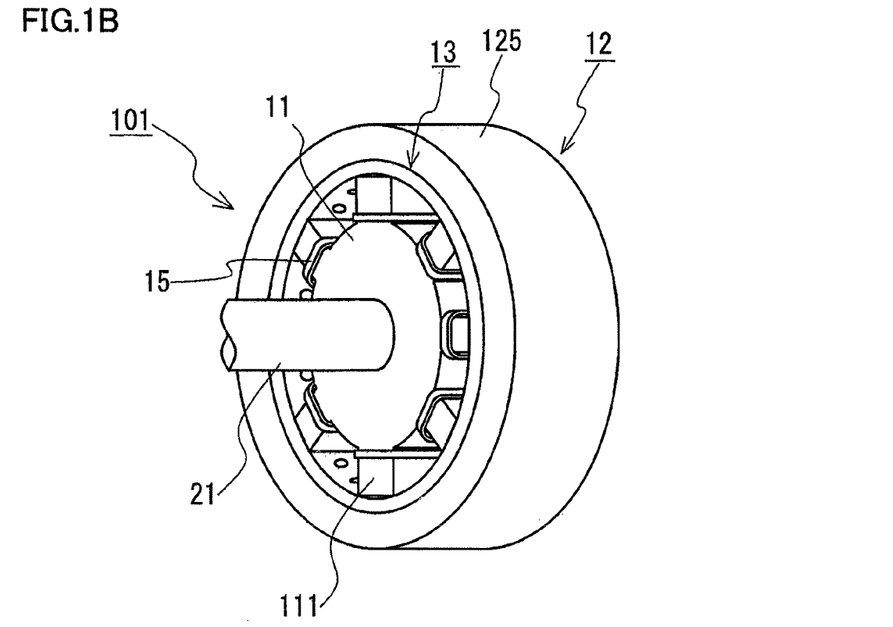
FIG. 1B shows an assembly perspective view.
Figure 2:
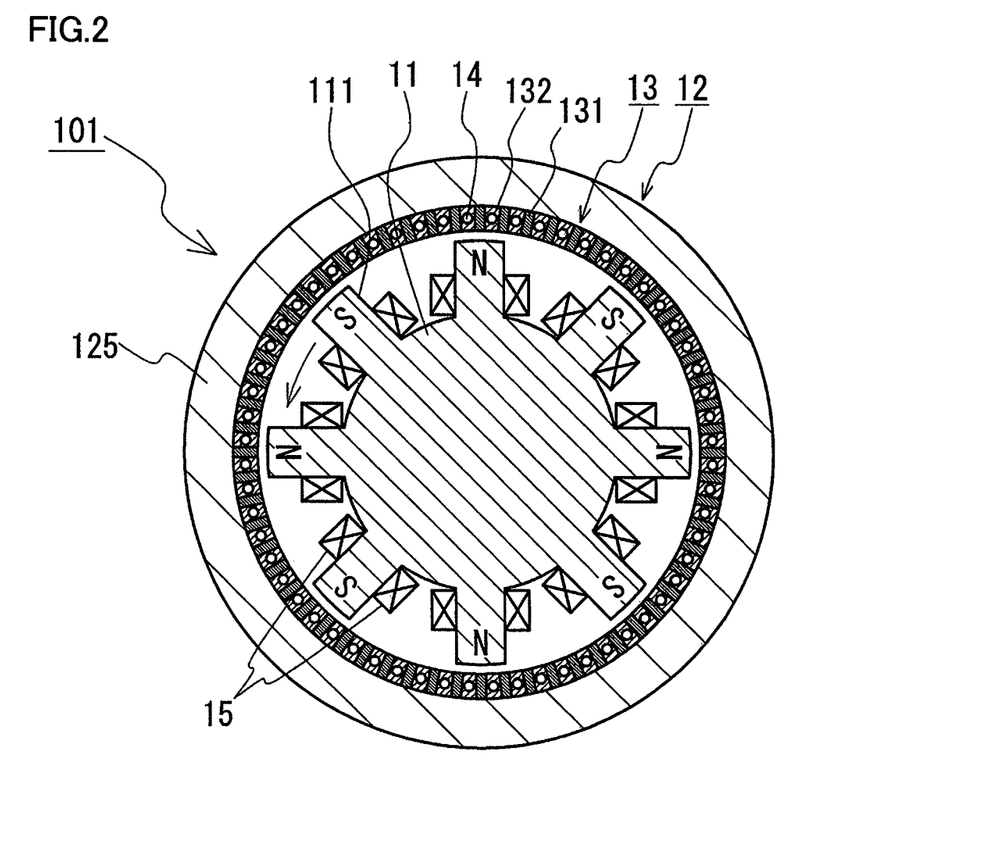
FIG. 2 is a schematic diagram of the induction heating apparatus according to the first embodiment, and is a front cross-sectional view cut in a direction perpendicular to an axial direction of the rotor.

Rotor 11 has a rotation shaft 21 that is rotatably supported, and has an outer shape as seen in an axial direction that is formed with a gear shape having a plurality of projections 111 that protrude in a radial direction. In this example, rotor 11 has eight projections 111, which are formed at equal intervals along a circumferential direction. A magnetic flux generating portion that will be described below (coil 15 in this example) is provided around an outer circumference of rotor 11. Here, rotor 11 rotates in a counterclockwise direction (the arrow in FIG. 2 shows a direction of rotation).

Material that forms rotor 11 may be any material having mechanical strength and is capable of supporting coil 15, regardless of whether it is a magnetic or non-magnetic material, and is preferably a material having excellent structural strength and long-term durability (weatherability and corrosion resistance). Examples of the material include composite materials such as iron, steel, stainless steel, aluminum alloy, magnesium alloy, GFRP (glass fiber reinforced plastics), CFRP (carbon fiber reinforced plastics), and the like, which are used as structural materials.

In this example, rotor 11 (including projections 111) is formed of a non-magnetic material. When a normal conducting coil is used as coil 15, rotor 11 is preferably formed of a magnetic material. On the other hand, when a superconducting coil is used, rotor 11 may be formed of either a magnetic material or a non-magnetic material.

Heating portion 13 is disposed outside rotor 11 in the radial direction at a distance from rotor 11, and is cylindrically formed to surround the circumference of rotor 11. Heating portion 13 is fixed to stator 12 that does not rotate.

Coil 15 is wound around and fixed to each projection 111 of rotor 11, so as to be opposed to heating portion 13, and represents a magnetic flux generating portion that generates magnetic flux in the radial direction of rotor 11 (direction of heating portion 13). Moreover, a not-shown direct-current power supply is connected to each coil 15. In this example, the direction of a magnetic field (magnetic flux) to be generated is determined by controlling the direction of a direct current to be supplied to each coil 15, and adjacent coils 15 have polarities different from each other (see FIG. 2). Each coil 15 is a superconducting coil, and is covered with a not-shown cooling jacket around its circumference, and is maintained in a superconducting state by being cooled. A normal conducting coil may be used as coil 15, and a permanent magnet may be used instead of coil 15. Current may be supplied to coil 15 by connecting coil 15 to an external power supply through a slip ring, for example.

Magnetic flux generated from coil 15 passes through heating portion 13. Heating portion 13 is formed of a composite material of a magnetic material and a conductive material, and has a structure in which a magnetic material portion 131 and a conductive material portion 132 are combined. In this example, an iron-based material containing iron is selected as the magnetic material, and an aluminum-based material containing aluminum or copper-based material containing copper is selected as the conductive material, and magnetic material portion 131 is formed of the iron-based material, and conductive material portion 132 is formed of the aluminum-based or copper-based material.

In heating portion 13, when coil 15 is in a position opposed thereto, a cross-sectional area of magnetic material portion 131 is smaller than an area of linkage of magnetic flux generated from coil 15 (corresponding to a cross-sectional area of projection 111 in this example). At this time, in a region of heating portion 13 where the linkage of magnetic flux from coil 15 occurs, magnetic material portion 131 and conductive material portion 132 are mixed, and a plurality of magnetic material portions 131 are dispersed (see FIG. 2).

Figure 3:
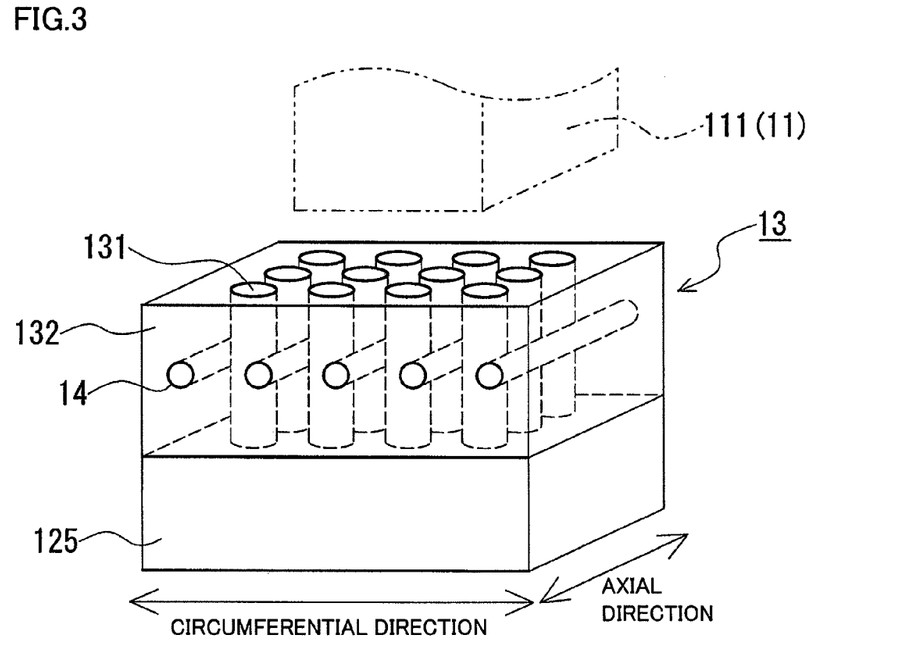
FIG. 3 is a partially enlarged developed perspective view, schematically showing the structure of a heating portion in the induction heating apparatus according to the first embodiment.

The structure of heating portion 13 is now described in detail. As shown in FIG. 3, magnetic material portions 131 are cylindrical members having a circular cross-sectional shape, and conductive material portion 132 is disposed to surround peripheries of magnetic material portions 131. Moreover, magnetic material portions 131 are formed to extend in a direction of thickness of heating portion 13 from an inner circumferential surface to an outer circumferential surface, and are arranged at equal intervals in an axial direction of heating portion 13. A plurality of such rows of magnetic material portions 131 are further disposed at equal intervals over an entire circumference of heating portion 13, and conductive material portion 132 is integrally formed to surround each magnetic material portion 131.

Flow passages 14 in which the heating medium circulates are provided in heating portion 13. In this example, a linear flow passage 14 is provided by forming a through-hole inside conductive material portion 132 between magnetic material portions 131 that are adjacent to each other in the circumferential direction, to be parallel to the axial direction of heating portion 13 (see FIG. 3). For example, in this case, flow passage 14 may have a structure in which the heating medium is supplied from one end and discharged from the other end, or a structure in which flow passage 14 has one end attached to a connection pipe connecting flow passage 14 and another flow passage 14, and the heating medium is supplied from the other end of flow passage 14 and discharged through the connection pipe from the other end of other flow passage 14. That is, the former structure is a one-way flow passage, and the latter structure is a round flow passage. With the latter structure, a distance of heating the heating medium can be lengthened, as compared with the former structure.

Furthermore, in this example, stator 12 has a cylindrical yoke portion 125 made of a magnetic material, and yoke portion 125 is disposed on a side of heating portion 13 opposite to the side having rotor 11 (outer circumference of heating portion 13). Magnetic material portions 131 are connected to yoke portion 125 and coupled to one another via yoke portion 125.

A heat insulating material (not shown) may be disposed around a periphery of heating portion 13. In this case, for example, a heat insulating material may be provided on the inner and outer circumferential surfaces of heating portion 13, and on regions of end surfaces of heating portion 13 excluding the regions where flow passages 14 are formed. Examples of the heat insulating material include rock wool, glass wool, foamed plastics, bricks, ceramics, and the like.

Next, a mechanism of heating the heating medium in induction heating apparatus 101 will be described in detail.

In induction heating apparatus 101, coil 15 is energized to generate magnetic flux in the radial direction of rotor 11, and magnetic flux passes through heating portion 13. When coil 15 is in the position opposed to heating portion 13, a large amount of magnetic flux passes through the region of heating portion 13 where the linkage of magnetic flux from coil 15 occurs, resulting in an increased magnetic field.

Conversely, when coil 15 is not in the position opposed to heating portion 13, the amount of passing magnetic flux decreases in the region of heating portion 13 where the linkage of magnetic flux from coil 15 occurs, resulting in a weakened magnetic field. Then, when coil 15 rotates together with rotor 11, it moves relative to heating portion 13, which causes magnetic flux that passes over the entire circumference of heating portion 13 to change, so that the magnetic field applied to heating portion 13 periodically changes. Consequently, eddy current is generated in heating portion 13 to heat heating portion 13, and the heating medium inside the flow passages is heated with the heat.

Here, since heating portion 13 in induction heating apparatus 101 is formed of the composite material of the magnetic material and the conductive material, a design can be made to increase the amount of heat generation by adjusting $\mu$ and $\sigma$ of heating portion 13, thereby improving the amount of heat generation. Moreover, since the plurality of magnetic material portions 131 are dispersed in the region of heating portion 13 where linkage of magnetic flux from coil 15 occurs, and magnetic material portions 131 are uniformly disposed over the entire heating portion 13, there is no imbalance between $\mu$ and $\sigma$ in heating portion 13 as a whole, thus allowing thermal distribution in heating portion 13 to be equalized. Furthermore, since flow passage 14 is provided in conductive material portion 132 between circumferentially arranged magnetic material portions 131, heat is transferred to the heating medium, and can be efficiently obtained. Furthermore, since magnetic material portions 131 are coupled via yoke portion 125 made of the same magnetic material, the amount of magnetic flux flowing through magnetic material portion 131 (heating portion 13) can be increased, and hence, further improvement in the amount of heat generation can be expected.

Additionally, since adjacent coils 15 in induction heating apparatus 101 have polarities different from each other, the direction of magnetic flux (magnetic field) differs between the case where coil 15 of the N-pole is opposed and the case where coil 15 of the S-pole is opposed. When coil 15 of the N-pole is in the position opposed to heating portion 13, the direction of magnetic flux (magnetic field) is from an inner circumference-side to an outer circumference-side (+ direction in the radial direction). On the other hand, when coil 15 of the S-pole is in the position opposed to heating portion 13, the direction of magnetic flux (magnetic field) is from the outer circumference-side to the inner circumference-side (− direction in the radial direction). That is, when coil 15 rotates together with rotor 11, the direction of magnetic flux (magnetic field) changes while periodically reversely rotating.

Furthermore, magnetic material portions 131 have a circular cross-sectional shape, which reduces cogging torque, thus achieving a smooth structure of the rotor.

First Modification

With induction heating apparatus 101 according to the first embodiment described above, as illustrated in FIG. 3, the case where magnetic material portions 131 in heating portion 13 are cylindrical members having a circular cross-sectional shape has been described; however, the shape of magnetic material portions 131 is not limited thereto. For example, magnetic material portions 131 may be prismatic members having a polygonal cross-sectional shape.

Figure 4:
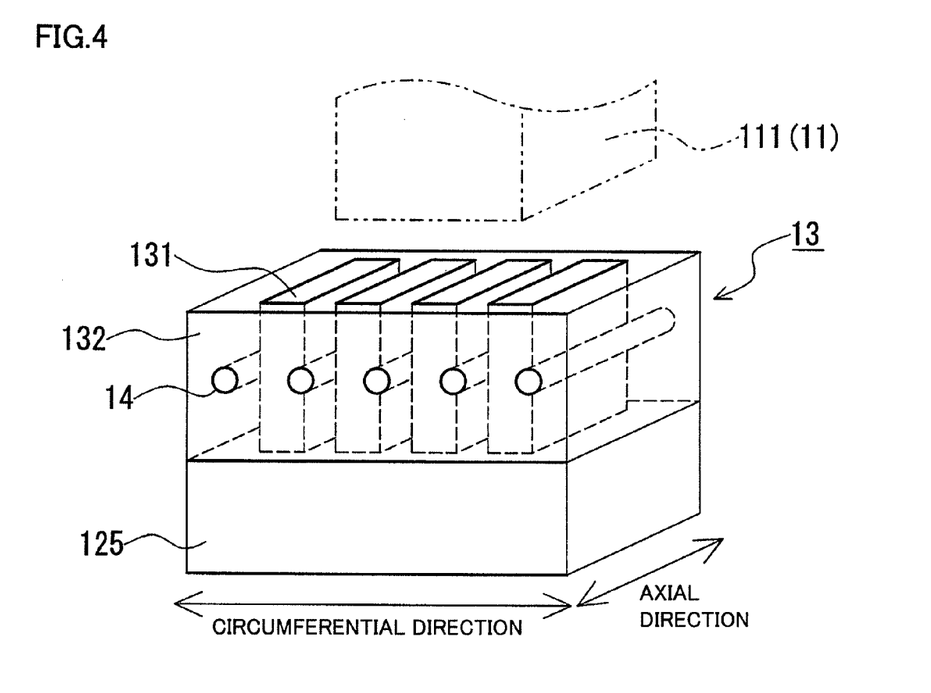
FIG. 4 is a partially enlarged developed perspective view, schematically showing a modification of the heating portion in the induction heating apparatus.

Moreover, magnetic material portions 131 may be plate-shaped members, as illustrated in FIG. 4. In the structure of heating portion 13 illustrated in FIG. 4, magnetic material portions 131 are plate-shaped members having a quadrangular cross-sectional shape, and conductive material portion 132 is disposed to surround peripheries of magnetic material portions 131. Magnetic material portions 131 are formed to extend in the direction of thickness of heating portion 13 from the inner circumferential surface to the outer circumferential surface, and are disposed in an upright position parallel to the axial direction of heating portion 13. A plurality of magnetic material portions 131 are also disposed at equal intervals over the entire circumference of heating portion 13, and conductive material portion 132 is integrally formed to surround each magnetic material portion 131. In this case, magnetic material portions 131 are disposed parallel to the axial direction of heating portion 13; however, they may also be disposed to incline toward the axial direction of heating portion 13. Moreover, magnetic material portions 131 may be disposed perpendicular to the axial direction of heating portion 13, and magnetic material portions 131 may be arranged in the axial direction of heating portion 13.

Furthermore, where magnetic material portions 131 are columnar members, although magnetic material portions 131 are disposed to align in the axial and circumferential directions of heating portion 13 in the structure of heating portion 13 illustrated in FIG. 3, they may also be disposed in a staggered pattern (zigzag pattern).

Second Modification

Figure 5A:
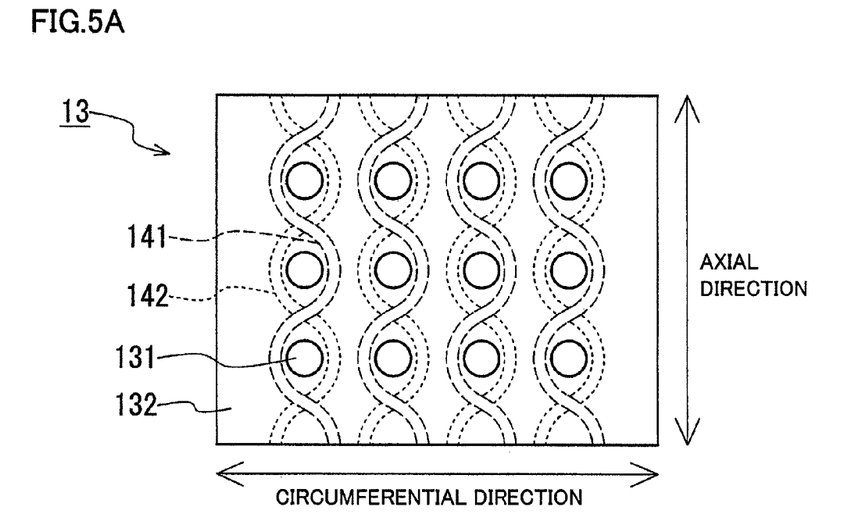
FIG. 5A shows one example of the flow passage in the structure of the heating portion illustrated in FIG. 3.
Figure 5B:
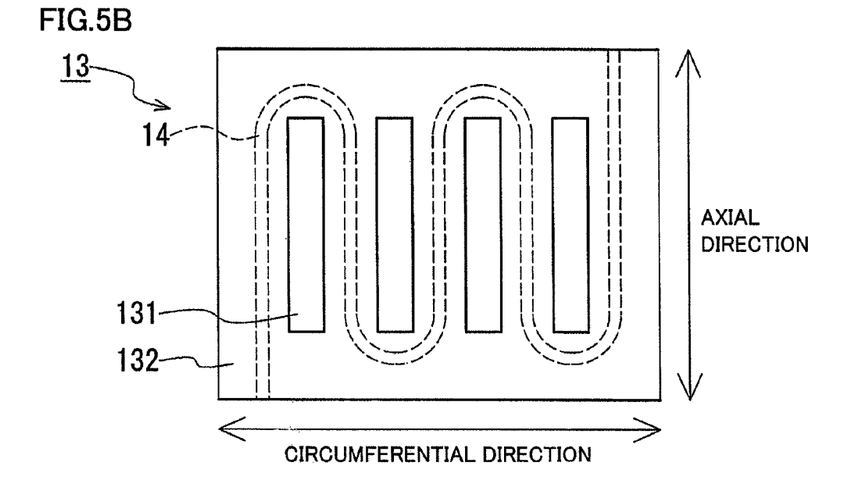
FIG. 5B shows one example of the flow passage in the structure of the heating portion illustrated in FIG. 4.

With induction heating apparatus 101 according to the first embodiment described above, as illustrated in FIG. 3, the case where linear flow passages 14 are provided parallel to the axial direction of heating portion 13 has been described; however, the shape of flow passage 14 is not limited thereto. For example, in the structure of heating portion 13 illustrated in FIG. 3, as illustrated in FIG. 5A, flow passages 141, 142 may be provided in the form of a serpentine to pass the inside of conductor material portion 132 between magnetic material portions 131 adjacent to each other in the axial direction. Moreover, flow passages 141, 142 are provided in different positions in the direction of thickness of heating portion 13. It is noted that FIG. 5A is a developed view of heating portion 13 shown in FIG. 3 when seen from the rotor 11-side, that is, from the inner circumferential surface-side, of heating portion 13 FIG. 5B is also the same). Furthermore, as shown in FIG. 5B, flow passage 14 may be provided in the form of a serpentine to continuously pass in the circumferential direction around conductor material portion 132 between magnetic material portions 131 that are adjacent to each other in the circumferential direction.

<Power Generation System>

Figure 6:
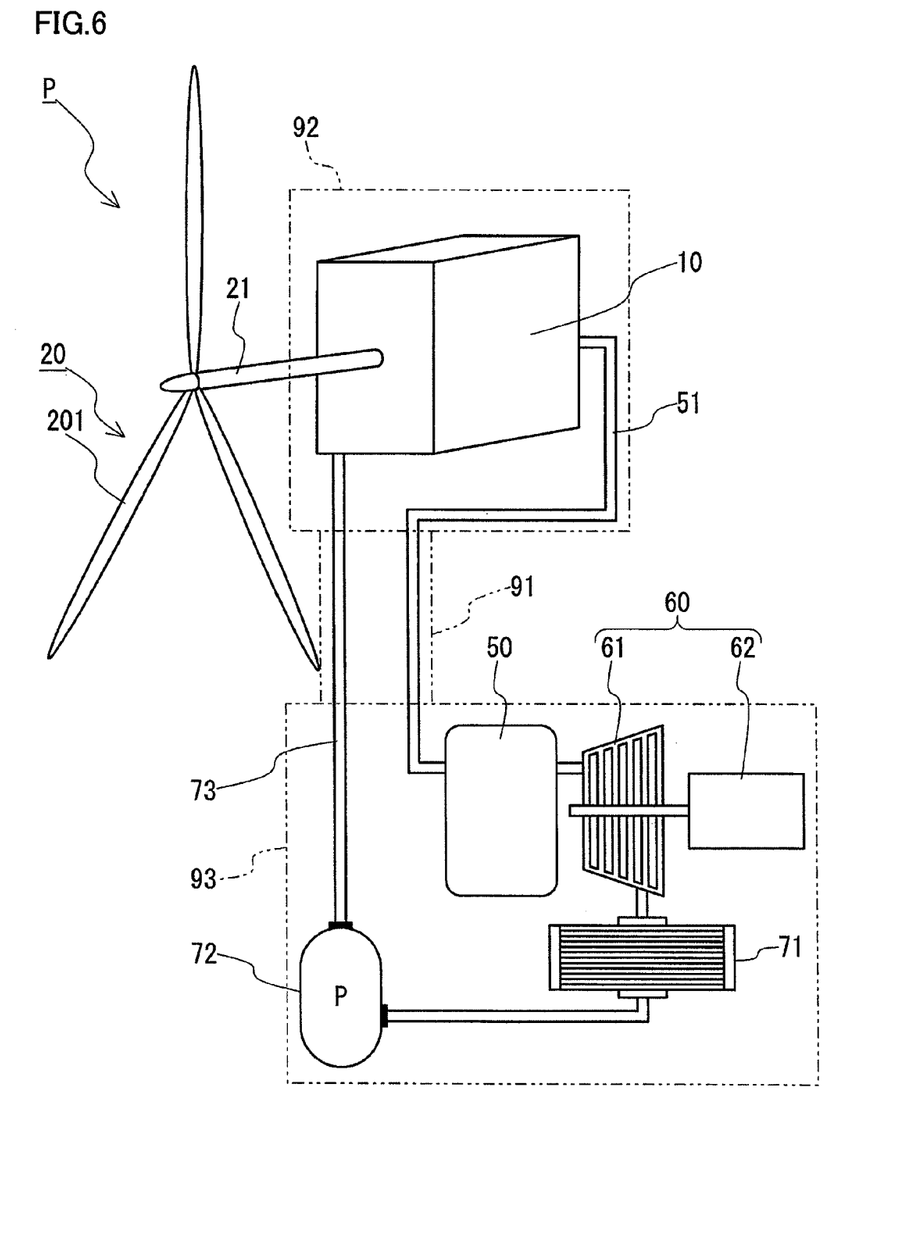
FIG. 6 is a schematic diagram showing one example of the overall structure of a power generation system according to the present invention.

Next, one example of the entire structure of a power generation system according to the present invention will be described using FIG. 6. Power generation system P shown in FIG. 6 includes an induction heating apparatus 10, a wind turbine 20, a heat storage device 50, and a power generation portion 60. Wind turbine 20 is attached to a nacelle 92 set up on the top of a tower 91, and induction heating apparatus 10 is housed in nacelle 92. Heat storage device 50 and power generation portion 60 are set up in a building 93 built on the bottom (base) of tower 91. The structure of power generation system P will be described in detail below.

Induction heating apparatus 10 is an induction heating apparatus according to the present invention, and induction heating apparatus 101 according to the first embodiment described above, for example, can be used as induction heating apparatus 10. The other end of rotor shaft 21 is directly coupled to wind turbine 20 described below, and wind power is utilized as mechanical power for rotating the rotor. Here, an example of a case where the heating medium is water is described.

Wind turbine 20 has a structure in which rotation shaft 21 that extends horizontally is used as a center, and three blades 201 are radially attached to rotation shaft 21. In the case of a wind power generation system whose output exceeds 5 MW, the diameter is about 120 m or greater, and the rotational speed is about 10 to 20 rpm.

The flow passage of induction heating apparatus 10 is connected to a water supply pipe 73 that supplies water to induction heating apparatus 10, and to a transport pipe 51 that delivers water heated by induction heating apparatus 10 to heat storage device 50. Then, with induction heating apparatus 10, magnetic flux is generated from the magnetic field generating portion provided in the rotor, and as the rotor rotates, the magnetic flux passing through the heating portion disposed at a distance from the rotor changes. This causes eddy current to be generated in the heating portion to heat the heating portion, thereby heating water inside the flow passage. Since heating portion 13 is formed of the composite material of the magnetic material and the conductive material, induction heating apparatus 10 provides an increased amount of heat generation, and is capable of heating water as the heating medium to a temperature as high as 100 to 600° C., for example. Moreover, since induction heating apparatus 10 has a structure such that the heating portion (flow passage) does not rotate, a rotary joint is not needed to connect the flow passage with transport pipe 51 and water supply pipe 73, and a robust connection can be realized with a simple structure by using welding, for example.

Power generation system P generates high-temperature and high-pressure water, by heating water to a temperature suitable for power generation (200 to 350° C., for example) with induction heating apparatus 10. High-temperature and high-pressure water is delivered to heat storage device 50 through transport pipe 51 that couples induction heating apparatus 10 and heat storage device 50. Heat storage device 50 stores the heat of the high-temperature and high-pressure water delivered through transport pipe 51, and supplies steam required for power generation to power generation portion 60, using a heat exchanger. Alternatively, steam may be generated by induction heating apparatus 10.

As heat storage device 50, a steam accumulator, a sensible heat-type storage device that uses a molten salt, oil, or the like, or a latent heat-type storage device that utilizes phase change of a high-melting-point molten salt can be used, for example. The sensible heat-type storage method stores heat at a phase-change temperature of a heat storage material, and therefore, generally has a narrow band of heat storage temperatures as compared with the latent heat-type storage method, and exhibits a high heat storage density.

Heat generation portion 60 has a structure in which steam turbine 61 and power generator 62 are combined, and when steam turbine 61 is rotated by steam supplied from heat storage device 50, power generator 62 is driven to generate electric power. High-temperature and high-pressure water or steam delivered to heat storage device 50 is cooled in a condenser 71 and returned to water. The water is then delivered to a pump 72, where it is turned into high-pressure water, passes through water supply pipe 73 and is delivered to induction heating apparatus 10, whereby it is circulated.

With power generation system P, heat is generated by obtaining rotational energy by using renewable energy (wind power, for example) as mechanical power, and electric power is generated by storing the heat in the heat storage device. In this way, stable power generation that meets demands can be realized without using expensive storage batteries. Moreover, there is no need to provide a speed-increasing machine as in conventional wind power generation systems, thus avoiding a trouble with a gearbox. Furthermore, by supplying the heat of the heating medium to the power generation portion set up on the bottom (base) of the tower, for example, through the transport pipe, it is unnecessary to house the power generation portion in the nacelle, thus achieving reductions in size and weight of the nacelle set up on the top of the tower.

Although the case where water is used as the heating medium has been described in the above-described power generation system, a liquid metal having thermal conductivity higher than that of water may also be used as the heating medium. One example of such a liquid metal may be liquid metal sodium. In the case of using a liquid metal as the heating medium, steam may be generated by, for example, using the liquid metal as a primary heating medium that receives heat from the heating portion, and heating a secondary heating medium (water) by means of a heat exchanger with the heat of the liquid metal delivered through the transport pipe.

In the case of using, as the heating medium, oil, a liquid metal, a molten salt, or the like, for example, having a boiling point exceeding 100° C. at normal pressure, when the heating medium is heated to a predetermined temperature, increase in internal pressure due to vaporization of the heating medium inside the flow passage can be easily suppressed, as compared with water.

It is noted that the present invention is not limited to the foregoing embodiments, and can be modified as appropriate without departing from the gist of the present invention. For example, the shapes or materials of the magnetic material portion and the conductor material portion in the heating portion, as well as the shape of the flow passage, for example, can be modified as appropriate.

The induction heating apparatus according to the present invention can be used not only for a power generation system utilizing renewable energy, but also for a hot water supply system, a heating system, and the like, for example. Furthermore, the power generation system according to the present invention can advantageously be used in the field of power generation utilizing renewable energy.

REFERENCE SIGNS LIST 10, 101: induction heating apparatus; P: power generation system; 11: rotor; 111: projection; 12: stator; 125: yoke portion; 13: heating portion; 131: conductive material portion 132: conductive material portion; 14, 141, 142: flow passage; 15: magnetic flux generating portion (coil); 21: rotation shaft; 20: wind turbine; 201: blade; 50: heat storage device; 51: transport pipe; 60: power generation portion; 61: steam turbine; 62: power generator; 71: condenser; 72: pump; 73: water supply pipe; 91: tower; 92: nacelle; 93: building.

The invention claimed is:

1. An induction heating apparatus that heats a heating medium, comprising:
   a rotor having a rotation shaft; and
   a stator having a heating portion disposed at a distance from said rotor,
   a magnetic flux generating portion, provided in said rotor and opposing said heating portion, that generates magnetic flux in a direction of said heating portion,
   said heating portion being formed of a composite material of a magnetic material and a conductive material, and having a structure in which magnetic material portions and a conductive material portion are combined so that said magnetic material portions are surrounded by said conductive material portion as viewed from said magnetic flux generating portion,
   when said magnetic flux generating portion is in a position opposed to said heating portion, a cross-sectional area of said magnetic material portion being smaller than a perpendicular cross sectional area of linked magnetic flux generated by said magnetic flux generating portion in said heating portion,
   said conductive material portion being disposed to partially surround a periphery of said magnetic material portion, and
   a flow passage in which said heating medium circulates being provided in said heating portion.

2. The induction heating apparatus according to claim 1, wherein
   when said magnetic flux generating portion is in the position opposed to said heating portion, a plurality of said magnetic material portions are present in a region of said heating portion where the linkage of magnetic flux from said magnetic flux generating portion occurs.

3. The induction heating apparatus according to claim 1, wherein
   said magnetic material portion has a circular or polygonal cross-sectional shape.

4. The induction heating apparatus according to claim 1, wherein
   the magnetic flux generated from said magnetic flux generating portion is magnetic flux generated by a coil.

5. The induction heating apparatus according to claim 1, wherein
   said conductive material portion is formed of an aluminum-based material.

6. The induction heating apparatus according to claim 1, wherein
   said rotation shaft is connected to a wind turbine, and
   wind power is utilized as mechanical power for rotating said rotor.

7. A power generation system comprising:
   an induction heating apparatus according to claim 1; and
   a power generation portion that converts heat of said heating medium heated by said induction heating apparatus into electrical energy.

* * * * *